United States Patent [19]

Muhlethaler

[11] Patent Number: 4,896,992
[45] Date of Patent: Jan. 30, 1990

[54] ADJUSTABLE MOUNTING FRAME ARRANGEMENT

[75] Inventor: Erhard Muhlethaler, Schalunen, Switzerland

[73] Assignee: Lanz Oensinger AG, Sudringstrasse, Switzerland

[21] Appl. No.: 251,118

[22] Filed: Sep. 29, 1988

[30] Foreign Application Priority Data

Sep. 29, 1987 [CH] Switzerland .................. 3780/87

[51] Int. Cl.$^4$ ..................... F16B 7/00; A47F 5/00
[52] U.S. Cl. ..................... 403/297; 403/205; 403/295; 403/362; 403/403; 211/182; 52/584; 52/726
[58] Field of Search ............. 403/205, 292, 295, 297, 403/298, 362, 403; 211/182, 183; 312/140, 257 SK; 52/656, 657, 633, 710, 726, 582, 584; 248/182

[56] References Cited

U.S. PATENT DOCUMENTS

| | | | |
|---|---|---|---|
| 3,368,836 | 2/1968 | Storlie | 403/295 |
| 3,513,606 | 5/1970 | Jones | 211/182 |
| 3,620,558 | 11/1971 | MacMillan | 403/290 |
| 4,104,000 | 8/1978 | Fleishmann | 403/297 X |
| 4,317,523 | 3/1982 | Konstant et al. | 211/182 X |
| 4,657,426 | 4/1987 | Targetti | 403/295 X |
| 4,829,735 | 5/1989 | Zwissler | 52/646 |

FOREIGN PATENT DOCUMENTS

| | | | |
|---|---|---|---|
| 295406 | 4/1971 | Fed. Rep. of Germany . | |
| 1304947 | 8/1962 | France . | |
| 2261690 | 9/1975 | France . | |
| 640975 | 6/1962 | Italy | 312/257.5 X |
| 376623 | 5/1964 | Switzerland . | |
| 1212438 | 11/1970 | United Kingdom . | |
| 2140280 | 11/1984 | United Kingdom | 403/403 |

Primary Examiner—Randolph A. Reese
Assistant Examiner—Franco S. Deliguori
Attorney, Agent, or Firm—Browdy and Neimark

[57] ABSTRACT

The mounting frame arrangement is assembled from profile frame sections and connectors and is used for control panel assemblies, for component racks and holders, in household wiring, for equipment cabinets, and the like. On the four-sided (preferably square) hollow profile, one side has a longitudinal slit and at least the two adjoining sides each have openings opposite one another and distributed at regular intervals. The disconnectable connectors have two pairs of legs opposite one another and spaced apart by an adjustable distance, which are insertable in a form-locking manner into the interior of the profile. By being spread apart by spreader devices, the legs are made to contact opposed inside walls of the profile. At the same time, as locking means for preventing longitudinal displacement, detent protrusions come to engage the openings. A transverse groove for the same purpose is also possible on the outsides of the legs and on the inside of the profile. Several variant profiles and connectors as well as specific embodiments of the spreader devices are described.

25 Claims, 4 Drawing Sheets

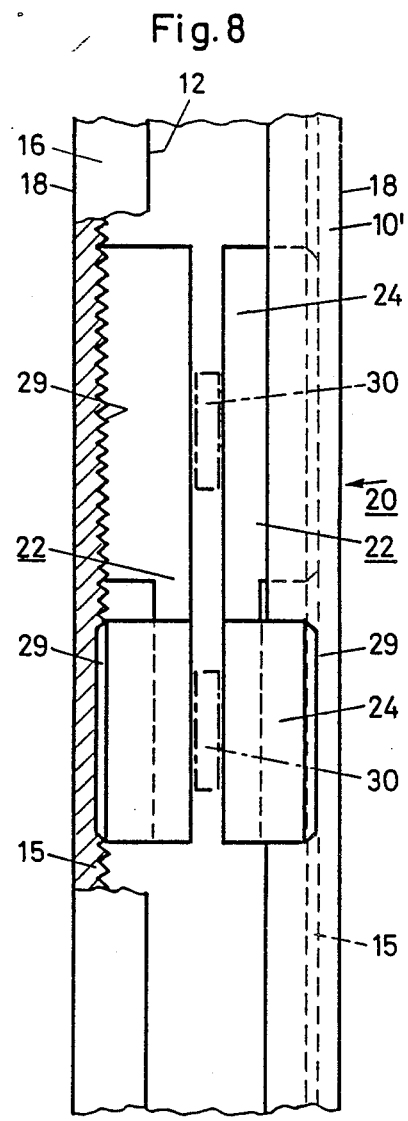
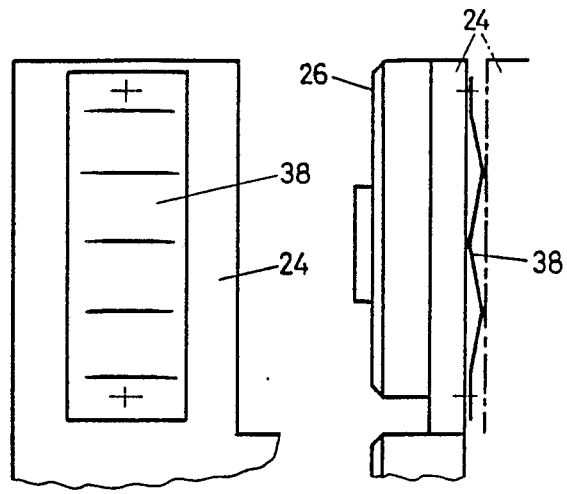
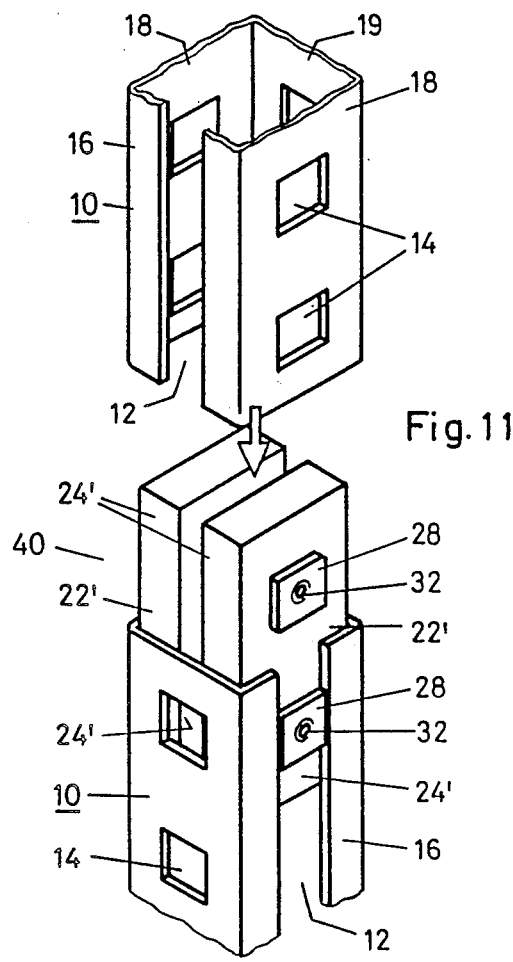
Fig. 8
Fig. 9
Fig. 10
Fig. 11

ADJUSTABLE MOUNTING FRAME ARRANGEMENT

FIELD OF THE INVENTION

The invention relates to an adjustable mounting frame arrangement with four-sided hollow profile sections, equipped with openings, and disconnectable connectors for two of such profile sections at a time, in which the connection can be made by means of a spreading action at the connectors.

BACKGROUND OF THE INVENTION

Mounting frames of this type are needed for example in control panel assemblies, for component racks and holders, in household wiring, for equipment cabinets, and the like. They are conventionally screwed together from perforated angle-profile or U-profile sections, optionally using separate corner connectors. Assembly by means of screwing is rather time-consuming, however, and any protruding nuts and screw heads may limit the use of the mounting frame. Because the profile sections overlap at the corners, they are offset relative to one another and so do not form a flat frame, and protruding corners or edges of the profiles may be dangerous and may also make the frames difficult to use.

In a known arrangement of the above type (Austrian Patent 295,406), two four-sided hollow profiles having the same cross section can be connected to one another at the corners, without overlapping. However, the profiles to be joined are different; one is provided with square windows on all four sides, while the other is provided with a longitudinal slit on one side (the other side is closed). The connector for this includes two blocks, which are longitudinally inserted into the slit profile and can be spread in it by means of a pressure screw. Two sheet-metal tabs, each protruding from one of the blocks at an angle, engage a window of the other profile from the outside. A connection of this kind cannot take significant loads, however, because on the one hand there is virtually only an edge-to-edge contact between the sheet-metal tab and the window, and on the other the connector is only inadequately secured against tension from the spreading in the other profile.

SUMMARY OF THE INVENTION

It is an object of the present invention to overcome the above disadvantages and to devise a versatile, heavy-duty mounting frame arrangement that requires only a single kind of profile and as few different parts as possible and can be assembled quickly and easily in manifold variations, as needed. This object is attained by providing the four-sided hollow profile with a longitudinal slit on one side and with locking means, on at least the two adjacent sides, that prevent longitudinal displacement, and by providing the connectors with two pairs of legs equipped with spreading devices. The width of the legs transverse to the spreading direction is adapted to the inside width of the profile, and each leg can be inserted into the interior of one hollow profile section, so that upon the ensuing spreading, detent devices present on the outside of the legs are brought into engagement with the aforementioned locking means and simultaneously effect form locking with the four inside walls of the profile.

In a mounting frame arrangement of this kind, there is no overlapping, and there are no protruding parts at the connection sites of the hollow profile sections. Because they are form locking, the connections have great stability, and the profile sections are aligned at right angles or parallel to one another automatically once the assembly is complete. With suitably embodied connectors, both flat frames and three-dimensional ones can be made. An astonishingly small number of different parts is sufficient; in particular, only one profile is needed, which not only makes the frame considerably simpler to use but also keeps the costs of manufacture and storage low.

According to preferred embodiment of the invention, an adjustable mounting frame arrangement comprises four-sided hollow profile sections having openings and at least one longitudinal slit on one side and locking means preventing longitudinal displacement on at least both adjoining sides, disconnectable connectors for connecting two such profile sections together, wherein the connection is affectable by spreading action at the connectors, and the connectors having two pairs of legs provided with at least one spreading device, the width of the legs transverse to the spreading direction being adapted to the inside width of the profile, the legs each being insertable into the interior of one hollow profile section, and detent devices located on the outside of the legs come into engagement with the aforementioned locking means upon spreading and substantially at the same time to effect form locking with the four inside walls of the profile.

The four-sided hollow profile may be a square profile. The locking means includes locking openings disposed at regular intervals on the sides of the hollow profile, which may be square and the width of the at least one longitudinal slit is equal to the length of a side of the square openings.

The locking means may include a groove, instead of the openings, transverse to the longitudinal direction of the profile provided on the inside of at least two opposed sides of the hollow profile.

The connectors are each embodied by one pair of substantially identical parts, the distance between which is adjustable by means of the at least one spreading device.

The connector parts comprise angle elements having two legs joined at right angles, and the two legs of the angle elements are braced by a wall connecting them. Each part of the pair has two legs flush with one another in a straight line.

The detent devices on the outside of the legs may comprise protrusions engaging the openings from the inside. The height of the protrusions is at most equal to the wall thickness of the profile.

The detent devices may instead comprise a transverse groove on an outside of the legs of the connectors engaging the inside of the groove on the profile.

One of the at least one spreading devices is disposed in the vicinity of each pair of legs. The at least one spreading device comprises a pressure screw seated in one part of the pair and positionable against the other part, and a corrugated leaf spring.

The height of the legs including the detent devices is less than the width of the at least one longitudinal slit.

According to an embodiment of the invention, a four sided hollow profile for a mounting frame arrangement is provided, one side of a hollow profile has a longitudinal slit and at least the two adjoining sides of the profile are provided with locking means accessible from inside the profile, for preventing longitudinal displacement of inserted profile connectors. The profile is a square profile.

The locking means comprises openings distributed at regular intervals in the sides of the profile.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

Exemplary embodiments of the invention will be described in further detail below in conjunction with the drawings, in which:

FIG. 8 shows a corner connector inserted into a profile section with a variant relating to the locking means for preventing displacement;

FIGS. 9 and 10 are a front and side view, respectively, of an example of the spreader device in the form of a corrugated leaf spring; and FIG. 11 is a perspective view prior to the joining of two profile sections showing a further type of connector that is used for straight, flush connection of two sections.

DESCRIPTION OF THE PREFERRED EMBODIMENTS

Figure 1:
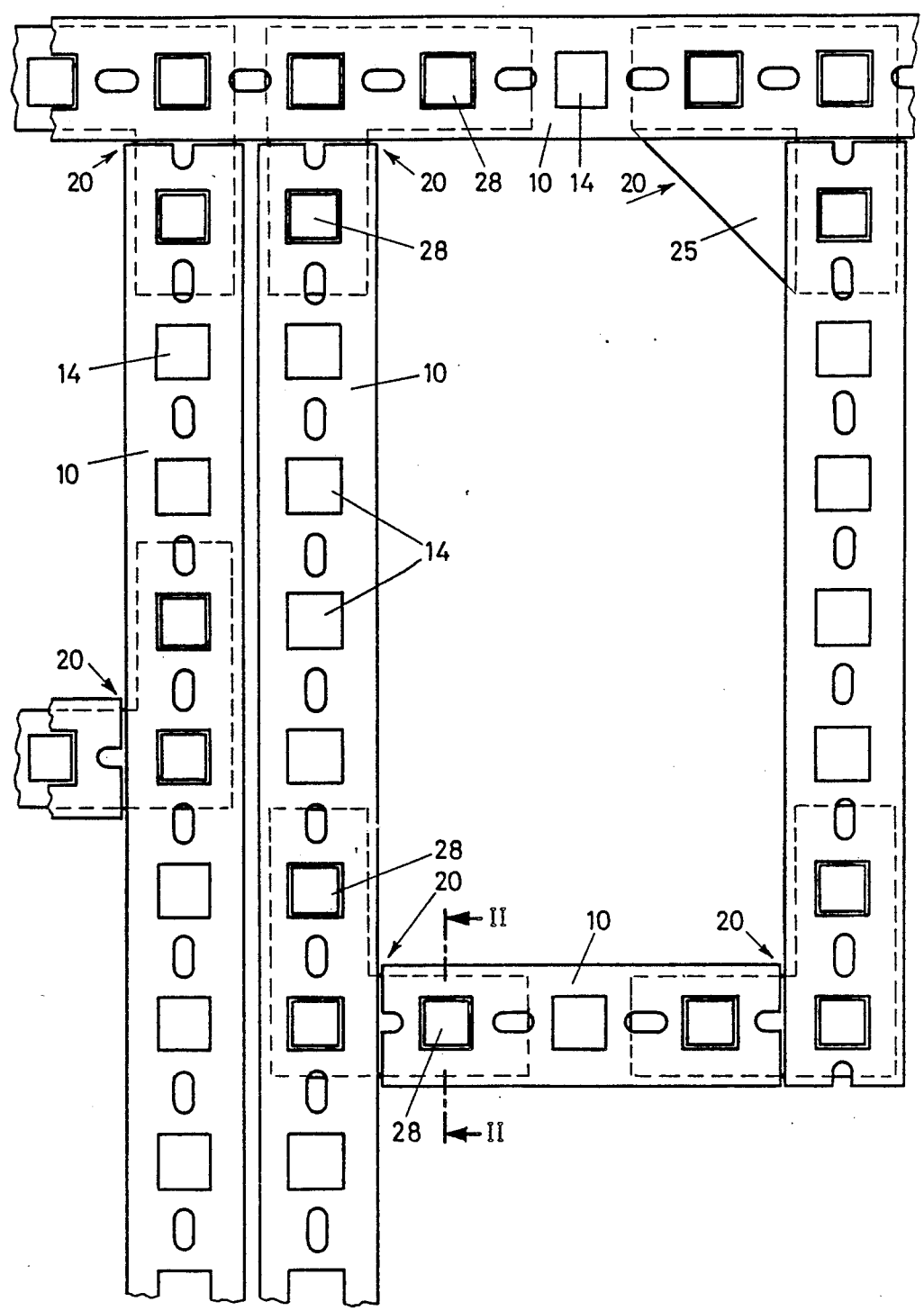
FIG. 1, in a projection, shows a detail of a flat mounting frame assembled in accordance with the system as needed.

As the detail of a flat mounting frame of FIG. 1 shows, the arrangement includes four-sided hollow profile sections 10 cut to length as needed, which can be connected rigidly but disconnectably connected to one another by means of corner connectors 20. As can be seen, corner connectors 20 can be inserted at arbitrary sites at a given longitudinal spacing on the hollow profile and connected to one end of a rectangularly protruding profile section. In this way, intermediate shelves can be formed as needed, or else parallel adjoining profile sections can be inserted.

Figure 2:
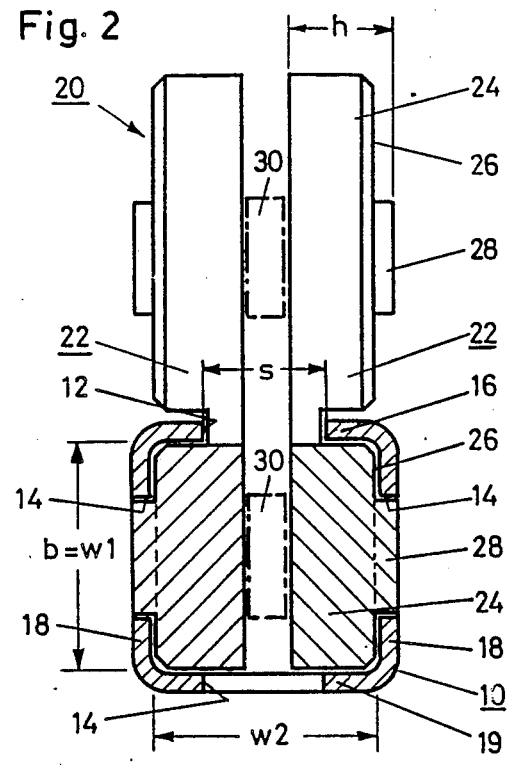
FIG. 2, on a larger scale, is a section taken along the line II—II of FIG. 1, in which the profile section extending parallel to the plane of the drawing has been left out.

The profile of which the sections 10 are made is a four-sided hollow profile, preferably a square profile, the cross section of which can be seen in FIG. 2. One profile side 16 has a continuous longitudinal slit 12, while the two profile sides 18 adjoining the slit side 16 each have opposed, preferably square openings 14 distributed at regular intervals. The side 19 opposite the slit side 16 also suitably has openings 14 distributed at the same intervals. The openings 14 form locking means for preventing longitudinal displacements of the connectors 20 or 40 to be described below, which are provided with suitable detent devices for engagement with the locking means.

The corner connectors 20 used here each comprise a pair of substantially identical parts, here angle elements 22, the spacing between which is adjustable by means of at least one spreading device 30 located between them; in FIGS. 2, 7, and 8, such spreading devices are shown merely schematically by dot-dash lines; suitable embodiments for them will be described in detail later herein.

The two legs 24 connected to one another at right angles of the angle elements 22 can be individually inserted through the longitudinal slit 12 into the interior of the hollow profile 10 and are then seated in a form-locking manner between the walls 16 and 19 of the profile section. On their outside 26, the legs 24 are each provided with a protrusion 28. These protrusions are intended as detent devices for engagement from the inside with openings 14, whenever the legs 24 are spread apart enough that their outsides rest on the inside of the profile walls 18. The engagement of the protrusions 28 then prevents any longitudinal displacement between the connector and the profile. The openings 14 and the protrusions 28 are preferably square, as shown, and arranged to fit in one another, but other shapes are entirely conceivable. Preferably, the slit width s on the profile 10 is selected to be equal to the length of a side of the square openings 14. It is also suitable for the height of the protrusion 28 to be at most equal to the thickness of the wall of the profile (see FIG. 2), so that the protrusions will not protrude beyond the outside of the profile. The aforementioned form locking between the connector and the profile, which enables the connection to withstand considerable bending forces, is brought about by adapting the width b of the legs 24 to the inside width w1 of the profile between the side 16 having the longitudinal section and the side 19 opposite it. Upon engagement of the protrusions 28 with the openings 14, a form lock is simultaneously brought about between the outsides 26 of the legs and the inner walls 18 of the profile.

In a variant of the angle element 22, its two legs 24 can be braced by a formed-on wall 25 (shown in dot-dash lines at top right in FIG. 1 and in FIGS. 3 and 4) connecting them, which enables an increase in stability or the provision of additional mounting options. According to FIGS. 2 and 7, each corner connector 20 has two spreaders 30, each disposed in the vicinity of a pair of legs embodied by two opposed legs 24. However, it is also possible as in FIG. 3 to use only a single spreader 30" per corner connector, which simultaneously acts upon all four legs or on both pairs of legs of a connector.

Figure 7:
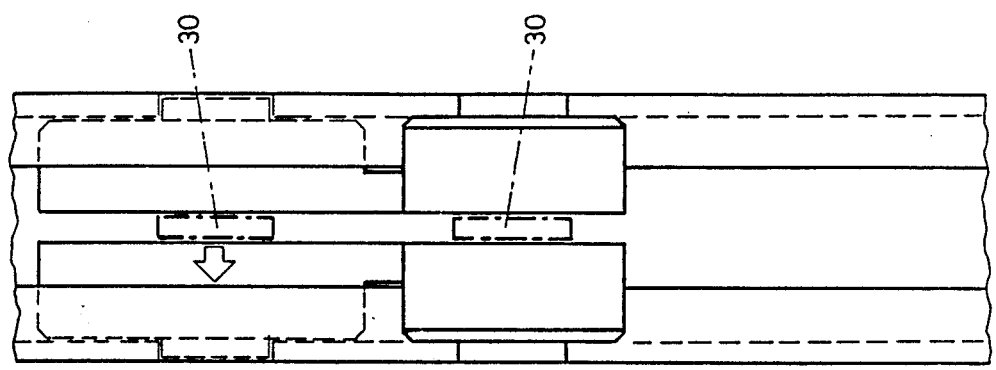
FIGS. 5-7 show three successive phases in the insertion of a corner connector into the longitudinal slit of a hollow profile section.
Figure 6:
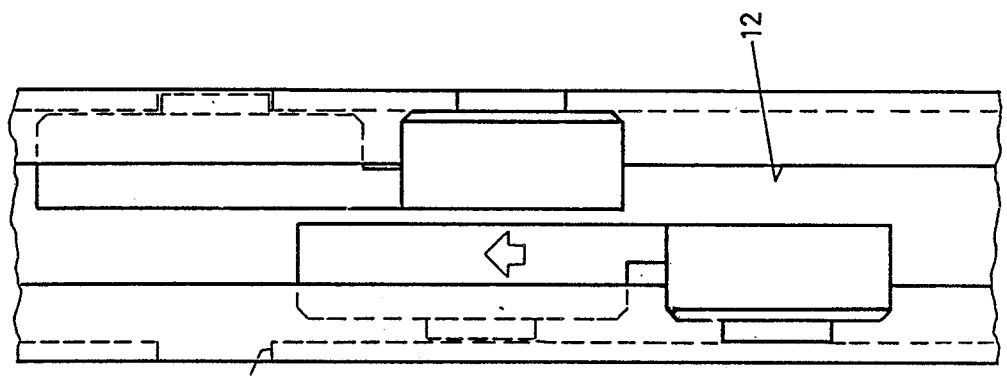
Figure 5:
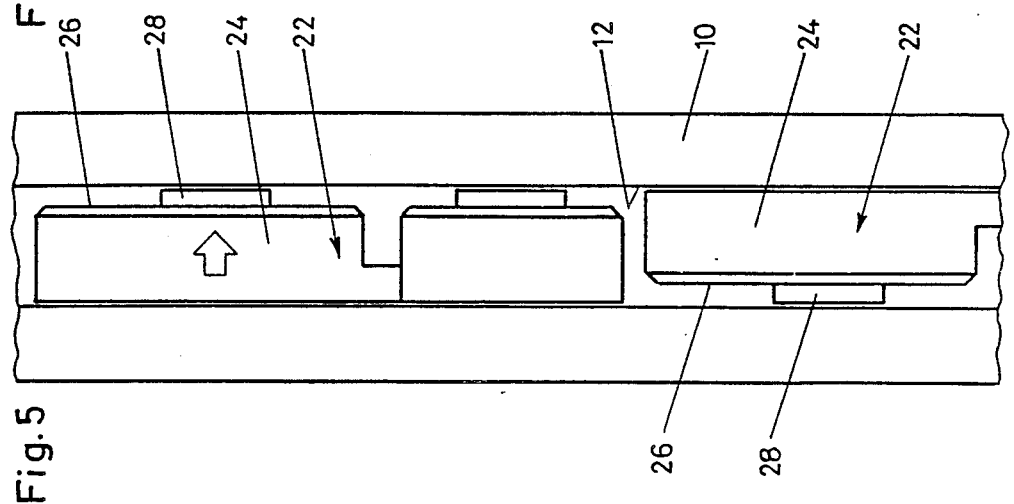

FIGS. 5-7 show the essential steps in mounting a corner connector on a profile section 10. In FIG. 5, one leg 24 of each angle element 22 of the corner connector is first introduced through the slit 12 into the interior of the hollow profile, the two angle elements being longitudinally offset from one another. To this end, the height h of the legs 24, including the detent device (protrusion 28) is somewhat less than the width s of the slit 12 (see FIG. 2). Next, as in FIG. 6, one angle element is pushed sideways, so that the outside 26 of the introduced leg rests on the profile, and the protrusion 28 engages one opening 14; the second angle element 22 of the pair can then be longitudinally displaced and brought to the same height as the first angle element. Finally, the spreader 30 is brought into play between the legs 24 located in the profile, that is, between their insides, so that both protrusions engage opposed openings and the corner connector is firmly anchored by a form lock on all four inside walls of the profile. The other pair of legs of the corner connector then protrudes perpendicularly out of the profile section. A second profile section can then be joined to these legs of the corner connector, by temporarily pushing the two angle elements together somewhat—counter to the spreader 30—and guiding the second profile section from the end longitudinally over the protruding legs. After the angle elements are again spread apart, optionally with the action of the second spreader both pairs of legs of the corner connector are identically locked to the two profile sections in a form locking manner and are protected against longitudinal displacement, and the connection is rigid.

Figure 3:
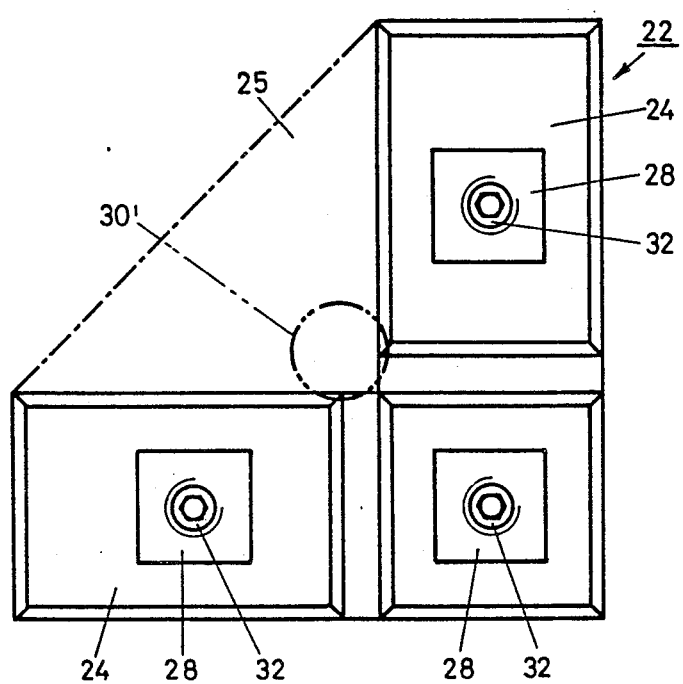
FIGS. 3 and 4 are a front and side view, respectively, of a single angle element of a corner connector.
Figure 4:
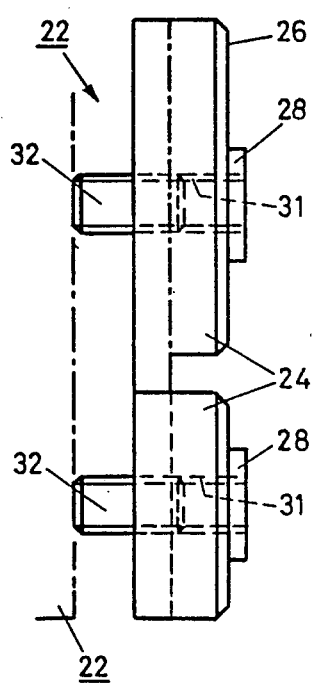

From FIGS. 3 and 4, a specific exemplary embodiment of a spreader can be seen, taking the angle connector 20 as an example. In one connector half 22, continuous threaded bores 31 are provided in the vicinity of the protrusions 28, while such bores are absent in the other half 22 (shown in dot-dash lines in FIG. 4). One pressure screw 32 is seated in countersunk fashion in each threaded bore 31 and can be positioned against the other half 22. When the connector is assembled, the screws 32 are first "retracted" inside the bores 31. Once the connector legs have been introduced, they can easily be positioned from outside against the other half and tightened. The legs are then spread apart inside the profile and braced by protrusion engagement.

A further (screwless) spreader is shown in FIGS. 9 and 10. It is embodied by a corrugated leaf spring 38, which is attached to the inside of one leg 24. It keeps the two associated legs inserted into the profile spread apart automatically, but can be compressed from the outside in order to disengage the protrusion. Other kinds of embodiment of spreaders 30 are possible, for example in the form of wedges, eccentrics, and the like.

FIG. 8, again for an angle connector 20', shows another embodiment of the locking means for preventing longitudinal displacement, instead of protrusions and openings. Here, the hollow profile 10' has a groove 15—at least on the sides 18 adjoining the side 16 having the longitudinal slit 12—located transversely to the longitudinal direction of the profile on its inside. Corresponding to this groove 15, the legs 24 of the connector 20' are provided with a transverse groove 29 on their outside, which when in contact with the inside of the profile engages the inside of the groove 15 and thus, as a detent device, prevents a longitudinal displacement between the connector and the profile. The profile 10' having the groove 15 can also be suitably provided with openings on at least the sides 18, although this has not been shown in FIG. 8.

FIG. 11 shows a further exemplary embodiment of a connector 40. The connector 40 again has two substantially identical parts 22', the distance between which is adjustable by means of spreaders, in this case two pressure screws 28. Unlike the angle connectors described above, each part 22' here has two legs 24' that are flush with one another in a straight line. The connector 40 is intended for conncting two profile sections 10 to one another in a straight line; in FIG. 11, connector 40 has already been inserted into the lower profile section with one pair of legs. The second section is then pushed onto the second pair of legs from above in the direction of the arrow (with the parts 22' in the unspread state), whereupon the form-locking connection, secured against tension, is finally established by spreading, which is accomplished here by means of pressure screws 32.

As spreaders for the parts 22' of the connector 40, not only pressure screws but any other above-described options are also possible. Correspondingly, transverse grooves 15 and 29 according to FIG. 8 are also conceivable as the locking means for preventing longitudinal displacement and as the corresponding detent devices, respectively.

Because of the fact that a square hollow profile is involved, and locking means (openings 14) are also present on the profile side 19 opposite the longitudinal slit 12 (see FIG. 2), the profile sections 10 can be joined in an arbitrary rotational position with the connectors. As FIG. 11 shows, the longitudinal slit 12 on one section 10 can be offset by 90° to one side or the other with respect to the longitudinal slit on the other section. The same option is available for the angle connectors 20. As a result, not only frames located in one plane as in FIG. 1 but three-dimensional frame structures can also be connected together.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. An adjustable mounting frame arrangement comprising:
    four-sided hollow profile sections having at least one longitudinal slit on one side of the sections, and locking means at least on the sides adjoining the side having the longitudinal slit, preventing longitudinal displacement;
    disconnectable connectors for connecting two such profile sections together, wherein the connection is affectable by spreading action at the connectors;
    said connectors having two pairs of legs provided with at least one spreading device, the width of the legs transverse to the spreading direction being adapted to the inside width of the profile;
    detent devices located on the outside of the legs which come into engagement with said locking means upon spreading and substantially at the same time to effect form locking with the four inside walls of the hollow profile, wherein the height of the legs, including the detent devices, is less than the width of the at least one longitudinal slit, the legs each being individually insertable into the interior of one hollow profile section through the longitudinal slit.

2. A mounting frame arrangement as defined by claim 1, wherein the four-sided hollow profile is a square profile.

3. A mounting frame arrangement as defined by claim 1, wherein the locking means comprises locking openings disposed at regular intervals on the sides of the hollow profile.

4. A mounting frame arrangement as defined by claim 3, wherein the locking openings are square.

5. A mounting frame arrangement as defined by claim 4, wherein the width of the at least one longitudinal slit is substantially equal to the length of a side of the square locking openings.

6. A mounting frame arrangement as defined by claim 3, wherein the connectors are each embodied by one pair of substantially identical parts, the distance between which is adjustable by means of the at least one spreading device.

7. A mounting frame arrangement as defined by claim 6, wherein the connector parts comprise angle elements having two legs joined at right angles.

8. A mounting frame arrangement as defined by claim 7, wherein one of the at least one spreading devices is disposed in the vicinity of each pair of legs.

9. A mounting frame arrangement as defined by claim 7, wherein the two legs of the angle elements are braced by a wall connecting them.

10. A mounting frame arrangement as defined by claim 6, wherein each part of the pair of substantially identical parts has two legs flush with one another in a straight line.

11. A mounting frame arrangement as defined by claim 6, wherein the detent devices on the outside of the legs comprise protrusions engaging the locking openings from the inside.

12. A mounting frame arrangement as defined by claim 11, wherein the height of the protrusions is at most equal to the wall thickness of the profile.

13. A mounting frame arrangement as defined by claim 6, wherein the at least one spreading device comprises a pressure screw seated in one part of the pair of substantially identical parts and positionable against the other part.

14. A mounting frame arrangement as defined by claim 6, wherein the at least one spreading device comprises a corrugated leaf spring.

15. A mounting frame arrangement as defined by claim 3, wherein the detent devices on the outside of the legs comprise protrusions engaging the locking openings from the inside.

16. A mounting frame arrangement as defined by claim 15, wherein the height of the protrusions is at most equal to the wall thickness of the profile.

17. A mounting frame arrangement as defined by claim 1, wherein the locking means comprises a groove located transversely with respect to the longitudinal direction of the hollow profile provided on the inside of at least two opposed sides of the hollow profile.

18. A mounting frame arrangement as defined by claim 17, wherein the detent devices comprise a transverse groove on an outside of the legs of the connectors engaging the groove on the inside of a side of the hollow profile.

19. A mounting frame arrangement as defined by claim 1, wherein one side of the hollow profile has one longitudinal slit and at least the two adjoining sides of the profile are provided with locking means accessible from inside the profile, for preventing longitudinal displacement of inserted profile connectors.

20. A four-sided hollow profile as defined by claim 19, wherein the profile is a square profile.

21. A four-sided hollow profile as defined by claim 19, wherein the locking means comprises locking openings distributed at regular intervals in the sides of the profile.

22. A four-sided hollow profile as defined by claim 21, wherein the locking openings are square.

23. A four-sided hollow profile as defined by claim 22, wherein the width of the longitudinal slit is substantially equal to the length of one side of the square locking openings.

24. A four-sided hollow profile as defined by claim 19, wherein the locking means comprises a groove located transversely with respect to the longitudinal direction of the profile.

25. A four-sided hollow profile as defined by claim 19, wherein the locking means are present on all sides of the profile that are not occupied by the longitudinal slit.

* * * * *